United States Patent
Higuchi et al.

(10) Patent No.: US 6,692,858 B2
(45) Date of Patent: Feb. 17, 2004

(54) ELECTROLYTE MEMBRANE FOR POLYMER ELECTROLYTE FUEL CELL AND PRODUCING METHOD THEREOF

(75) Inventors: Yoshiaki Higuchi, Kanagawa (JP); Ichiro Terada, Kanagawa (JP); Hiroshi Shimoda, Kanagawa (JP); Satoru Hommura, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 192 days.

(21) Appl. No.: 09/820,850

(22) Filed: Mar. 30, 2001

(65) Prior Publication Data
US 2001/0026883 A1 Oct. 4, 2001

(30) Foreign Application Priority Data

Mar. 31, 2000 (JP) ........................................ 2000-096596
Apr. 18, 2000 (JP) ........................................ 2000-116215

(51) Int. Cl.[7] ........................ H01M 8/10; H01M 6/18; H01M 6/00
(52) U.S. Cl. ........................ 429/33; 429/309; 29/623.3
(58) Field of Search ............................ 429/30, 33, 309; 29/623.3

(56) References Cited

U.S. PATENT DOCUMENTS 5,599,614 A  2/1997  Bahar et al. ................. 442/171

FOREIGN PATENT DOCUMENTS

| EP | 0 094 679 | | 11/1983 |
| JP | 06-231779 | * | 8/1994 |
| JP | 2001-035508 | * | 2/2001 |

* cited by examiner

Primary Examiner—Patrick Ryan
Assistant Examiner—Thomas H. Parsons
(74) Attorney, Agent, or Firm—Oblon, Spivak, McClelland, Maier & Neustadt, P.C.

(57) ABSTRACT

A method for producing an electrolyte membrane for a polymer electrolyte fuel cell, which comprises forming into a membrane a mixture of a perfluorocarbon polymer having sulfonic acid groups or their precursors and a fluorocarbon polymer which can be fibrillated, laminating a support membrane for stretching to at least one side of the resulting membrane, and stretching the resulting laminated membrane under heating.

33 Claims, No Drawings

ELECTROLYTE MEMBRANE FOR POLYMER ELECTROLYTE FUEL CELL AND PRODUCING METHOD THEREOF

FIELD OF THE INVENTION

The present invention relates to an electrolyte membrane for a polymer electrolyte fuel cell.

BACKGROUND OF THE INVENTION

As a power generation system, attention has been drawn to a hydrogen/oxygen fuel cell which gives substantially no adverse effect to the global environment since its reaction product is only water in principle. Polymer electrolyte fuel cells were once mounted on space ships in the Gemini Project and the Bio-satellite Project, but the cell power densities at that time were low. Thereafter, alkaline fuel cells having higher performance have been developed, and such alkaline fuel cells have been employed for space crafts including current space shuttles.

Whereas, along with the progress of technology in recent years, attention has been drawn again to polymer electrolyte fuel cells, for the following reasons. (1) As a polymer electrolyte, a highly conductive membrane has been developed. (2) Obtaining an extremely large activity has been made possible, since a catalyst to be used for a gas diffusion electrode layer is supported on carbon and coated with ion exchange resins.

For further improvement in the performance, it may be conceived to increase the concentration in sulfonic acid group density and to decrease the thickness of a solid polymer electrolyte membrane. However, a remarkable increase in the concentration in sulfonic acid group density will cause the following problems; deterioration in mechanical strength and tear strength of the electrolyte membrane and changes in the size during handling of the electrolyte membrane, and a decrease in durability due to creep phenomenon of the electrolyte membrane, etc. On the other hand, a decrease in its thickness will cause the following problems; deterioration in mechanical strength and tear strength of the electrolyte membrane, and lowering in e.g. workability and handling in such a case wherein a membrane is bonded with a gas-diffusion electrode.

As a method for resolving the above-mentioned problems, it has been proposed that a porous membrane made of polytetrafluoroethylene (hereinafter referred to as PTFE) is impregnated with a fluorine type ion exchange polymer having sulfonic acid groups (JP-B-5-75835). With the membrane reinforced with porous-like PTFE obtained by such a method, the electric resistance will not be sufficiently lowered, while the thickness of the membrane can be thinned. Further, with such a method, the interface of the PTFE porous membrane and the ion exchange polymer is not bonded completely. Accordingly, when the membrane is used as an electrolyte membrane in a polymer electrolyte fuel cell for a long period of time, a leak of hydrogen gas will increase to result in the deterioration of the cell performance due to its insufficient bonding.

As another method for resolving the problems, a cation exchange membrane has been proposed which is reinforced with a perfluorocarbon polymer of fibrilliform, fabric-form or unwoven fabric-form. (JP-A6-231779) The performance in the power generation of the fuel cell using such a membrane is considerably good due to its low electric resistance, but the thickness is from 100 to 200 $\mu$m at smallest, which is not thin enough and has lack of uniformity in thickness, and thus the power generation characteristics and the mass productivity is still insufficient.

The object of the present invention is to provide an electrolyte membrane for a polymer electrolyte fuel cell, which is a reinforced membrane with a thin and uniform thickness, excellent in the power generation performance, capable of mass production and also excellent in a hydrogen gas barrier property.

SUMMARY OF THE INVENTION

The present invention provides a method for producing an electrolyte membrane for a polymer electrolyte fuel cell, which comprises forming into a membrane a mixture of a perfluorocarbon polymer having sulfonic acid groups or their precursors and a fluorocarbon polymer which can be fibrillated, laminating a support film for stretching to at least one side of the resulting membrane, and stretching the laminate of the membrane and the support film under heating.

In accordance with such a method, an electrolyte membrane reinforced with fibril reinforcement can be produced which is excellent in the strength even with a thin thickness. Further, by adding to the above-mentioned method a step of laminating a non-reinforced membrane to the reinforced-film with fibril reinforcement, it is possible to produce an electrolyte membrane composed of a laminate comprising a cation exchange layer reinforced with a fibril reinforcement and a non-reinforced cation exchange layer.

Further, the present invention provides an electrolyte membrane for a polymer electrolyte fuel cell, and a polymer electrolyte fuel cell equipped with such an electrolyte membrane, wherein the membrane comprising a cation exchange membrane made of perfluorocarbon polymer having sulfonic acid groups, reinforced with reinforcement made of fibrilliform fluorocarbon polymer, the membrane having a thickness of from 3 to 70 $\mu$m and number of fibrils of the reinforcement having a fibril-fiber diameter of at most 1 $\mu$m accounting for at least 70% based on the total number of fibrils.

Further, the present invention provides a method for producing an electrolyte membrane for a polymer electrolyte fuel cell, wherein the membrane is a laminate comprising at least two cation exchange layers made of a perfluorocarbon polymer having sulfonic acid groups, of which at least one layer is reinforced with reinforcement made of fibrilliform fluorocarbon polymer, and at least one layer is not substantially reinforced with reinforcement, which comprises the following steps:

a step of preparing a precursor membrane of a fibril-reinforced membrane, comprising forming into a membrane a mixture of a perfluorocarbon polymer having precursors of sulfonic acid groups and a fluorocarbon polymer which can be fibrillated to obtain a precursor membrane of a fibril-reinforced membrane;

a step of preparing a non-reinforced membrane, comprising forming into a membrane a perfluorocarbon polymer having precursors of sulfonic acid groups to obtain a non-reinforced membrane;

a step of stretching the precursor membrane to obtain a fibril-reinforced membrane; and a step of laminating the fibril-reinforced membrane or the precursor membrane and the non-reinforced membrane.

Furthermore, the present invention provides an electrolyte membrane for a polymer electrolyte fuel cell and a polymer electrolyte fuel cell equipped with such an electrolyte membrane, wherein the membrane composed of a laminate comprising at least two cation exchange layers made of a perfluorocarbon polymer having sulfonic acid groups, of which at least one layer is reinforced with reinforcement made of a fibrilliform fluorocarbon polymer, and at least one layer is not substantially reinforced with any reinforcement.

DETAILED DESCRIPTION OF THE INVENTION

In the present invention, a precursor of a sulfonic acid group means a group which can be converted to sulfonic acid group (—$SO_3H$ group) by e.g. hydrolysis, a treatment for converting to acid forms. As such an example, a —$SO_2F$ group, a —$SO_2Cl$ group, etc. may be mentioned.

A reinforcing material consisting of fibrilliform of a fluorocarbon polymer (hereinafter referred to as fibril reinforcement) in the present invention can attain reinforcing effects such as an increase in tear strength and improvement in dimensional stability even with its small contents in the cation exchange membrane. Further, such material is an effective reinforcing material since an increase in the electric resistance of the membrane can be suppressed when the fibril reinforcement is incorporated.

A perfluorocarbon polymer having sulfonic acid groups (hereinafter referred to as sulfonic acid type perfluorocarbon polymer) reinforced with fibril reinforcement is a useful membrane in view of its low electric resistance and high mechanical strength. However, such a membrane tends to have a high hydrogen gas permeability, comparing with a membrane made of a sulfonic acid type perfluorocarbon polymer containing no fibril reinforcement. When such a membrane having a high hydrogen gas permeability is used as an electrolyte membrane for a fuel cell, a hydrogen supplied to an anode will penetrate to a cathode and react directly with oxygen supplied to a cathode over a cathode catalyst. As a result, it will cause useless consumption of hydrogen and oxygen, leading to lower power output of a fuel cell.

Accordingly, in order to reduce such a hydrogen gas permeability, as an electrolyte membrane for a fuel cell, it is preferred to use a laminate-membrane comprising a cation exchange layer made of a sulfonic acid type perfluorocarbon polymer reinforced with the fibril reinforcement (hereinafter referred to as fibril-reinforced layer) and a cation exchanger layer made of a sulfonic acid type perfluorocarbon polymer not reinforced with the fibril (hereinafter referred to as non-reinforced layer).

In such a case, the electrolyte membrane is a laminate-membrane, wherein at least one of each of a fibril-reinforced layer and a non-reinforced layer is laminated, and thus is not a laminate either of fibril-reinforced layers alone or non-reinforced layers alone. The electrolyte membrane is preferably laminated to have a symmetrical structure in the thickness direction in view of a handling of the membrane and dimensional stability attributed to changes in temperature and humidity. For example, the following structures may be mentioned. In the case of three layers: a fibril-reinforced layer/a non-reinforced layer/a fibril-reinforced layer or a non-reinforced layer/a fibril-reinforced layer/a non-reinforced layer. In the case of five layers: e.g. a fibril-reinforced layer/a non-reinforced layer/a fibril-reinforced layer/a non-reinforced layer/a fibril-reinforced layer, or a non-reinforced layer/a fibril-reinforced layer/a non-reinforced layer/a fibril-reinforced layer/a non-reinforced layer.

In the case of at least five layers, the composition of each fibril-reinforced layer may be different from one another and the composition of each non-reinforced layer may also be different from one another. For example, the following structures may be mentioned: a fibril-reinforced layer 1/a non-reinforced layer/a fibril-reinforced layer 2/a non-reinforced layer/a fibril-reinforced layer 1, or a non-reinforced layer 1/a fibril-reinforced layer/a non-reinforced layer 2/a fibril-reinforced layer/a non-reinforced layer 1.

In the present invention, in a case wherein the electrolyte membrane is solely made of a fibril-reinforced membrane, the thickness is preferably from 3 to 70 $\mu$m, and in a case wherein the electrolyte membrane is a laminate-membrane comprising a fibril-reinforced layer and a non-reinforced layer, the thickness is also preferably from 3 to 70 $\mu$m. If the thickness of the electrolyte membrane is less than 3 $\mu$m, defects will likely arise when it is bonded to an electrode, and if the thickness exceeds 70 $\mu$m, the membrane resistance will be increased. The thickness is particularly preferably from 10 to 30 $\mu$m, since the membrane resistance is low and no defects arise, and further the power generation is excellent and stable, when the membrane is evaluated after it is assembled into a fuel cell.

Further, when an electrolyte is composed of a fibril-reinforced layer and a non-reinforced layer, the thickness of each layer is preferably from 0.5 to 50 $\mu$m and from 0.3 to 50 $\mu$m, respectively, particularly preferably from 3 to 30 $\mu$m and from 1 to 30 $\mu$m, respectively. If the thickness of each fibril-reinforced layer is less than 0.5 $\mu$m, serious defects tend to arise during the production of the fibril-reinforced layer, and the reinforcing effect with fibril reinforcing material is likely reduced. If the thickness of each fibril-reinforced layer exceeds 50 $\mu$m, the resistance of the obtained membrane will be increased. On the other hand, the thickness of each non-reinforced layer is less than 0.3 $\mu$m, defects tend to arise during the lamination with the fibril-reinforced layer, and if it exceeds 50 $\mu$m, the resistance of the membrane will be increased.

In the present invention, number of fibrils of the fibril reinforcement having a fiber-diameter of at most 1 $\mu$m accounts for preferably at least 70%, more preferably at 95% based on the total number of fibrils. The fibril-diameter of the fibril reinforcement is required to be evaluated with an ultimately obtained membrane incorporating the material for a fuel cell, since the fiber-diameter of the fibril in the fibril reinforcement will be minimized due to the stress during the processing and forming of the reinforced membrane.

The fiber-diameter of the fibril in the fibril reinforcement may be evaluated by the following method. Namely, the membrane incorporating the reinforcement is immersed in a polar solvent such as ethanol at a high temperature, whereby the perfluorocarbon polymer having sulfonic acid groups (hereinafter referred to as sulfonic acid type perfluorocarbon polymer) constituting the membrane is dissolved to take out only the fibril reinforcement, and then the fiber-diameter of such a fibril reinforcement is measured. However, it is preferred to use a method in which the cross section of the membrane is observed with a scanning electron microscope for measuring the fibril-diameter and the number of fibrils, since it is easily carried out. In the fibril reinforcement, if the number of fibrils having a fiber-diameter of at most 1 $\mu$m accounts for less than 70% based on the total number of fibrils, the reinforcing effect to be attained will be lowered.

The amount of the fluorocarbon polymer constituting the fibril reinforcement to be used in the present invention is preferably from 0.5 to 15% based on the total mass of the fibril-reinforced membrane or the fibril-reinforced layer. If the amount is less than 0.5%, the reinforcing effect will not be satisfactory, and if the amount exceeds 15%, the electric resistance of the membrane will be likely increased. The amount is particularly preferably from 2 to 8%, since the resistance of the membrane will not be increased and the reinforcing effect will also be sufficiently attained, and furthermore, the processibility of fibril-reinforced membrane or the fibril-reinforced layer will be improved as well.

In the present invention, it is preferred that the fibril reinforcement contains at least 80%, based on the total mass of the reinforcing material, of PTFE or a copolymer containing polymer units derived from tetrafluoroethylene in an amount of at least 95 mol % based on the copolymer. If the amount of the PTFE or the copolymer having at least 95 mol % of polymer units derived from tetrafluoroethylene is less than 80%, fine fibrils will hardly be formed, whereby the reinforcing effect to be obtained will not be likely sufficient.

As an example of the copolymer containing polymer units derived from tetrafluoroethylene in an amount of at least 95 mol % based on the copolymer may be mentioned the following ones: a copolymer of tetrafluoroethylene-hexafluoropropylene, a copolymer of tetrafluoroethylene-chlorotrifluoroethylene, a copolymer of tetrafluoroethylene-perfluoro(alkylvinyl ether), tetrafluoroethylene-perfluoro(2,2-dimethyl-1,3-dioxole), a copolymer of tetrafluoroethylene-perfluoro(butenylvinyl ether), etc. In such examples, if the amount of the polymer units derived from tetrafluoroethylene is less than 95 mol %, the fibrillation tends to be hardly made, whereby the reinforcing effect will be decreased, such being not preferred.

As a sulfonic acid type perfluorocarbon polymer in the present invention, a conventional known polymer may be extensively employed. As an example of a preferred polymer, may be mentioned a copolymer of a perfluorovinyl compound represented by the following formula and a perfluoroolefin or a perfluoroalkylvinyl ether.

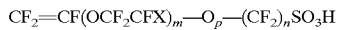

$$CF_2=CF(OCF_2CFX)_m-O_p-(CF_2)_nSO_3H$$

wherein (X is a fluorine atom or a trifluoromethyl group, m is an integer of from 0 to 3, n is an integer of from 0 to 12, p is 0 or 1, and if n is 0, p is 0). As an example of the above perfluorovinyl compound, the compound represented by the following formula may be mentioned. In the following formula, q is an integer of from 1 to 9, r is an integer of from 1 to 8, s is an integer of from 0 to 8, and z is 2 or 3.

$$CF_2=CFO(CF_2)_qSO_3H \qquad \text{Formula 1}$$

$$CF_2=CFOCF_2CF(CF_3)O(CF_2)_rSO_3H \qquad \text{Formula 2}$$

$$CF_2=CF(CF_2)_sSO_3H \qquad \text{Formula 3}$$

$$CF_2=CF[OCF_2CF(CF_3)]_zOCF_2CF_2SO_3H \qquad \text{Formula 4}$$

A polymer containing polymer units derived from a perfluorovinyl compound having sulfonyl groups is usually produced by polymerizing a perfluorovinyl compound having $—SO_2F$ group. While a perfluorovinyl compound having $—SO_2F$ groups can be polymerized by itself, it is usually copolymerized with e.g. a comonomer such as a perfluoroolefin or a perfluoro(alkylvinyl ether), as described above. As a perfluoroolefin to be used as a comonomer, usually, tetrafluoroethylene, hexafluoropropylene, etc. may be mentioned. Among them, tetrafluoroethylene is preferably employed.

As a perfluoro(alkylvinyl ether) to be used as a comonomer, a compound represented by $CF_2=CF—$ $(OCF_2CFY)_t—OR^f$ is preferably mentioned. In the formula, Y is a fluorine atom or a trifluoromethyl group, t is an integer of from 0 to 3, $R^f$ is a normal or a branched chain perfluoroalkyl group represented by $C_uF_{2u+1}$ ($1 \leq u \leq 12$).

As a preferred example of the compound represented by the formula: $CF_2=CF—(OCF_2CFY)_t—O—R^f$, the following compounds may be mentioned. In the formula, v is an integer of from 1 to 8, w is an integer of from 1 to 8 and x is an integer of from 1 to 3.

$$CF_2=CFO(CF_2)_vCF_3 \qquad \text{Formula 5}$$

$$CF_2=CFOCF_2CF(CF_3)O(CF_2)_wCF_3 \qquad \text{Formula 6}$$

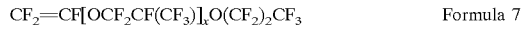
$$CF_2=CF[OCF_2CF(CF_3)]_xO(CF_2)_2CF_3 \qquad \text{Formula 7}$$

Further, instead of a perfluoroolefin and a perfluoro (alkylvinyl ether), as such a comonomer, a fluorine-containing monomer such as perfluoro(3-oxahepta-1,6-diene) may be copolymerized with a perfluorovinyl compound having $—SO_2F$.

In the present invention, the concentration of the sulfonic acid groups in a sulfonic acid type perfluorocarbon polymer constituting an electrolyte membrane, i.e. an ion exchange capacity is preferably from 0.5 to 2.0 milli equivalent/g dry resin, particularly preferably from 0.7 to 1.6 milli equivalent/g dry resin. If the ion exchange capacity is less than the above range, the electric resistance of the resulting electrolyte membrane will become high. On the contrary, if the ion exchange capacity is higher than the above range, the mechanical strength of the resulting electrolyte membrane will be insufficient.

The tear strength of the electrolyte membrane in the present invention is preferably at least 1 N/mm, particularly preferably at least 2 N/mm, even if it is measured at whichever direction. The ratio of the tear strength in the highest direction/the one in the lowest direction is preferably from 1/1 to 10/1. For example, in a case where a fibril-reinforced membrane or a fibril-reinforced layer constituting an electrolyte membrane is formed into a film by means of a uni-axial extrusion, the tear strength in the passing direction of a single screw extruder (hereinafter referred to as MD direction) is the lowest one, and the tear strength in the vertical direction to the MD direction (hereinafter referred to as TD direction)) is the highest one.

In the present invention, the above tear strength is measured by a method similar to those specified in JIS (Japanese Industrial Standard) K 7128, as described below. A strip-shaped specimen having 5 cm in width and 15 cm in length is prepared, and a direction of the tear strength of the specimens to be measured is set as a longitudinal direction. A longitudinal slit extending from the center of the short side over half its length (7.5 cm) of the total length (15 cm) is formed on each specimen so that the specimen is divided into two equal parts along the longitudinal direction. The specimen is set in a tensile strength testing machine so that one of the cut end of the specimen is gripped by the upper chuck of the machine and the other cut end is gripped by the lower chuck of the machine, whereby the specimen will be torn from the tip of the slit along the length. The distance between the chucks is broaden at a speed of 200 mm/mm, at a temperature of 25° C. and at a relative humidity of 50%, and the tear load is measured. The tear strength (N/mm) is calculated by dividing the tear load measured above with the thickness of the specimen. The tear strength of from about 5 to 10 specimens in each direction is measured and their average value is the tear strength shown below.

The electrolyte membrane comprising a fibril-reinforced membrane in the present invention can be obtained by forming into a membrane a mixture of a perfluorocarbon polymer having sulfonic acid groups or their precursors and a fluorocarbon polymer which can be fibrillated, laminating a support film for stretching to at least one side of the resulting membrane, and stretching the laminate of the membrane and the support film under heating. The stretching may be of uni-axial one in which stretching is carried out in MD direction alone or in TD direction alone, or may be of a biaxial one in which stretching are carried out both in MD and TD directions. In the case of the uni-axial stretching, it is preferred to stretch the membrane in TD direction so that the mechanical characteristics (tear strength) of the membrane will be made substantially equal in MD direction and in TD direction. In the case of the biaxial stretching, the membrane can be stretched in MD direction and in TD direction simultaneously or sequentially.

When a membrane for an electrolyte membrane is to be stretched, stretching of such a membrane alone is easily torn and it is difficult to thin it uniformly. However, when a membrane having a support film for stretching is stretched, such a membrane for an electrolyte membrane can be made thin uniformly. Namely, the support film for stretching in the present invention is the one which is laminated in order to assist the stretching of the membrane to be used for an electrolyte membrane.

More specifically, the above film is preferably produced as described in the following:

(1) A step of mixing a fluorocarbon polymer which can be fibrillated and a perfluorocarbon polymer having precursors of sulfonic acid groups (hereinafter referred to as sulfonic acid precursor type perfluorocarbon polymer);

(2) a step of kneading and pelletizing of the mixture obtained in (1) by means of a twin screw extrusion;

(3) a step of forming into a membrane the pellets obtained in (2) by means of a single screw extrusion, followed by smoothing;

(4) a step of hydrolyzing, converting to acid-forms, washing and drying;

(5) a step of laminating a support film for stretching, followed by stretching.

The steps from (1) to (5) will be described in the following.

The fibril reinforcement can be obtained by applying shear strength to a powder of fluorocarbon polymer which can be fibrillated. Accordingly, at first, the fibril reinforcement is produced solely, and then is mixed with a sulfonic acid precursor type perfluorocarbon polymer, or is dispersed into a solution of a sulfonic acid precursor type perfluorocarbon polymer, followed by casting to produce a reinforced membrane.

In order to disperse the fibril reinforcement uniformly in the membrane, after mixing of a fluorocarbon polymer to be fibrillated and a sulfonic acid precursor type perfluorocarbon polymer (the step(1)), the resulting mixture is preferably kneaded to fibrillate the powder of the fluorocarbon polymer (the step (2)). Further, after the powder of the fluorocarbon polymer is mixed and dispersed into the solution which is obtained by polymerizing sulfonic acid precursor type perfluorocarbon monomer, the resulting dispersion may be aggregated, washed and dried, followed by kneading.

At this moment, a mixture of a fluorocarbon polymer which can be fibrillated and a perfluorocarbon polymer having precursors of sulfonic acid groups may be kneaded by means of a twin screw extrusion for pelletizing thereof. Instead, the above-mentioned mixture may be kneaded beforehand, and then will be followed by a twin screw extrusion.

In the step (3), the resulting pellets are subjected to a single screw extrusion, preferably under heating, to form into a membrane. Instead, without the pelletizing procedure in (2), the mixture is subjected to a direct extrusion, whereby the membrane-formation and the fibrillation of the fluorocarbon polymer may be carried out simultaneously in this extrusion step. When the above single screw extrusion is carried out, the temperature of the membrane to be obtained is preferably from about 200 to about 270° C. If the temperature of the film is less than 200° C., the delivering pressure tends to be too high, leading to a low productivity. If the temperature of the film exceeds 270° C., it is not preferred because the surface of the membrane obtained will be rough, thereby resulting in the un-uniformity of the membrane thickness. As a result, the thickness of the film obtained from the step (3) is at a level of from 80 to 500 $\mu$m.

The film obtained by the above step may be smoothed by means of a heat press, if necessary, because an increase in the amount of the fibril reinforcement tends to decrease in the smoothness of the membrane. The steps from (1) to (3) are almost carried out under heating, and thus, it is preferred to use a sulfonic acid precursor type perfluorocarbon polymer.

In a case where a sulfonic acid precursor type perfluorocarbon polymer is used, a hydrolysis, a treatment for converting to acid-forms, washing and drying (the step (4)) will be subsequently carried out, whereby the precursors of sulfonic acid groups will be converted to sulfonic acid groups. This step (4) may be carried out after the step (5), or may be carried out in the course of the step (5), if it is stretched more than one time.

Then, a support film for stretching is laminated to the resulting membrane as described above under heating by using a roll press heated at a temperature of for example from about 70 to about 100° C., followed by stretching under heating, preferably in biaxial directions and removing the support film to obtain a thin membrane (the step (5)). While the stretch ratio per one time stretching operation may vary depending on the kinds of a sulfonic acid type perfluorocarbon polymer, it is preferably at most 30 times in terms of an area stretch ratio. Such stretching can be repeatedly carried out many times, whereby a thin membrane having a thickness of less than 1 $\mu$m can be obtained.

When the thickness of the membrane to be obtained from the step (3) exceeds 200 $\mu$m, it is preferred to adjust the thickness of the membrane to 200 $\mu$m or less by carrying out the step (5) prior to the step (4), even when a sulfonic acid precursor type perfluorocarbon polymer is employed. Namely, a support film for stretching is laminated to at least one side of the film and then, if required, the stretching is carried out at least one time. When the amount of the fibril reinforcement is increased, the above stretching tends to cause a defect, and thus it is preferred to heat-treat the resulting stretched membrane at a temperature of about 160 to about 200° C. by using a heated-press.

The support film for stretching to be used in the above step (5) is not particularly limited so long as it is stretchable. For example, the following may be mentioned: a polyethylene terephthalate film, a polybutylene terephthalate film, a polyethylene film, an ethylene-α-olefin copolymer film, an ethylene-vinyl alcohol copolymer film, an ethylene-vinyl acetate copolymer film, an ethylene-vinyl acetate-vinyl chloride copolymer film, an ethylene-vinyl chloride copolymer film, a polypropylene film, a polyvinyl chloride film, a polyamide film, a poly vinyl alcohol film, etc. Among them is preferred a polyethylene terephthalate film or a polypropylene film.

Particularly preferred is a polyethylene terephthalate film in its amorphous form or a cast-formed polypropylene film, since they can be stretched at a relatively low temperature and are excellent in their stretching performance. While the stretching temperature varies depending on the kinds of support film to be stretched, it is preferably within the ranges of from 40 to 200° C. particularly from 40 to 150° C. from the viewpoint of the stretching performance.

When the electrolyte membrane in the present invention is comprised of a fibril-reinforced layer and a non-reinforced layer, such a fibril-reinforced layer may be produced in the same manner as in the fibril-reinforced membrane. Namely, by the step of preparing a precursor membrane of a fibril-reinforced membrane, a mixture of a sulfonic acid precursor type perfluorocarbon polymer and a fluorocarbon polymer which can be fibrillated may be formed into a membrane, and then, in the stretching step, the resulting membrane is stretched to obtain a fibril-reinforced film, from which a fibril-reinforced layer will be prepared. Besides the above step, in the step of preparing non-reinforced film, a sulfonic acid precursor type perfluorocarbon polymer is formed into a membrane, by which a non-reinforced layer will be prepared. Then, in the laminating step, the above fibril-reinforced membrane or the precursor membrane and the non-reinforced membrane are laminated to obtain an electrolyte membrane.

The stretching step mentioned above may be carried out under heating after laminating a support film for stretching to at least one side of the membrane made from above-mentioned mixture. Namely, it is preferably carried out in the same manner as in the step (5). Further, this stretching may be carried out before or after the lamination of the precursor membrane of a fibril-reinforced membrane and the non-reinforced membrane. When the stretching is carried out after such lamination, the precursor membrane and the support film for stretching are not always laminated adjacent to each other.

More specifically, the preparation is preferably carried out by the following steps:

(A) a step of mixing of a fluorocarbon polymer which can be fibrillated and a sulfonic acid precursor type perfluorocarbon polymer (the same as in the step(1));

(B) a step of kneading and palletizing of the mixture obtained in (A) by means of a twin screw extrusion (the same as in the step(2));

(C) a step of forming the pellets obtained in (B) into a membrane by means of a single screw extrusion and smoothing the resulting membrane to obtain a precursor membrane of a fibril-reinforced membrane (the same as in the step(3));

(D) a step of laminating a support film for stretching, followed by stretching and heat-treatment (the same as in the step(5));

(E) a step of preparing a non-reinforced film made of a sulfonic acid precursor type perfluorocarbon polymer by a single screw extrusion;

(F) a step of laminating of the fibril-reinforced film or the precursor film and the resulting non-reinforced film;

(G) a step of hydrolyzing, converting to acid-forms, washing and drying (corresponding to the step (4)).

The above-mentioned steps (A), (B) and (C) are the same as the steps (1), (2) and (3), respectively. After the step (C) has been terminated, and if the thickness of the precursor membrane of a fibril-reinforced membrane exceeds 200 $\mu$m, it is preferred that a support membrane for stretching is laminated to at least one side of the precursor membrane and then, if required, to stretch the resulting laminate of the precursor membrane and the support film a few times, whereby a fibril-reinforced layer having the thickness adjusted to 50 $\mu$m or less is produced (the step (D)). Specifically, a support film for stretching is laminated to the precursor membrane of a fibril-reinforced membrane as described above under heating by using a roll press heated at a temperature of for example from about 70 to about 100° C., followed by stretching under heating and then removing the support film therefrom to obtain a fibril-reinforced membrane having a thickness of 50 $\mu$m or less. When the amount of the fibril reinforcement is increased, the above stretching may cause a defect, and thus it is preferred to heat-treat the resulting membrane after the step (D).

On the other hand, besides the above step, a sulfonic acid precursor type perfluorocarbon polymer alone may be formed into a membrane by using uni-axial extrusion to prepare a non-reinforced membrane having a thickness of preferably from 3 to 50 $\mu$m (the step (E)). The resulting non-reinforced membrane and the above obtained fibril-reinforced membrane the precursor membrane are laminated under heating by using a roll press heated at, for example, from about 100 to about 250° C. to prepare a laminate-membrane having a thickness at a level of from 3 to 70 $\mu$m (the step (F)).

Then, the resulting laminate-membrane is subjected to a hydrolysis, a treatment for converting to acid-forms, washing and drying (the step (G)), whereby a thin film can be obtained. While the stretch ratio per one time stretching operation may vary depending on the kinds of a sulfonic acid type perfluorocarbon polymer, it is preferably at most 30 times in terms of an area stretch ratio. Such stretching can be repeatedly carried out many times, whereby the thin membrane having a thickness of less than 1 $\mu$m can be obtained.

The above laminating step (F) may be carried out prior to the stretching step (D). However, an increase in the fibril content tends to cause a defect in the non-reinforced layer during the stretching step, and thus the laminating step (F) is preferably carried out after the stretching step (D). The above hydrolysis and a treatment for converting to acid-form step (G) may be carried out prior to the laminating step (F). Namely, the fibril-reinforced membrane and the non-reinforced membrane are hydrolyzed and converted to acid-forms and then laminated.

While the electrolyte membrane comprising a fibril-reinforced layer and a non-reinforced layer may be obtained usually through the steps mentioned above, the non-reinforced layer can be obtained by means of a cast-forming procedure. Namely, after the steps of from (A) to (C), the membrane obtained is heat-laminated with a support film for stretching and then stretched under heating (the step (D)). Then, the resulting membrane is subjected to the step (G) to obtain a fibril-reinforced membrane having acid-forms, followed by casting the solution of a sulfonic acid type perfluorocarbon polymer on the above fibril-reinforced membrane without carrying out of the steps of (E) and (F). Instead, the above step of (G) can be carried out prior to the stretch operation.

Further, a solution of a sulfonic acid type perfluorocarbon polymer may be cast on a substrate which is provided separately to prepare a non-reinforced layer, followed by laminating the resulting non-reinforced layer to the above fibril-reinforced membrane to obtain an electrolyte membrane comprising a fibril-reinforced layer and non-reinforced layer. More specifically, a substrate having a non-reinforced layer formed thereon by a casting method is laminated to at least one side of the acid-form fibril-reinforced membrane obtained by the same manner as described above such that a side of the substrate having the non-reinforced layer will be contact the fibril-reinforced membrane. Then, by using e.g. a hot-press means, the non-reinforced layer may be transferred onto the fibril-reinforced membrane, followed by removing the substrate to obtain an electrolyte membrane comprising a fibril-reinforced layer and a non-reinforced layer.

Herein, the substrate to be used in the above cast-forming method of a solution of a sulfonic acid type perfluorocarbon polymer is not particularly limited, so long as it can be readily removed from the non-reinforced layer after a hot-press, and for example, a polyester film may be employed.

The polymer electrolyte fuel cell of the present invention may be assembled by a conventional method such as the following method. At first, conductive carbon black powder loading fine particles of a platinum catalyst is mixed with the solution of a sulfonic acid type perfluorocarbon polymer to obtain a uniform dispersion, and using the resulting dispersion, a gas diffusion electrode is obtained by either one of the following two methods. As a membrane, is employed a cation exchange membrane made of a sulfonic acid type perfluorocarbon polymer reinforced with the fibril reinforcement mentioned above, or a cation exchange membrane composed of a laminate comprising a cation exchange layer made of a sulfonic acid type perfluorocarbon polymer reinforced with the fibril reinforcement and a cation exchange layer made of a sulfonic acid type perfluorocarbon polymer.

The first method is a method wherein the above-mentioned dispersion is coated on sides of a cation exchange membrane and dried, and then a carbon cloth or a carbon paper is adhered to each side of the membrane. The second method is a method wherein the above dispersion is coated on each two pieces of carbon cloth or carbon paper and then dried, followed by sandwiching a cation exchange membrane between by two pieces of the carbon cloth or the carbon paper so that the side having the uniform dispersion coated thereon can be adhered to the cation exchange membrane.

The obtained membrane-electrode assembly may be sandwiched between separators made of e.g. conductive carbon plates having grooves formed for passage of a fuel gas or an oxidizing gas and assembled into a cell to obtain a polymer electrolyte fuel cell.

In a polymer electrolyte fuel cell obtained as described above, a hydrogen gas is supplied to its anode side and oxygen or air is supplied to its cathode side. At the anode, a reaction: $H_2 \rightarrow 2H^+ + 2e^-$ occurs and at the cathode, a reaction: $\frac{1}{2}O_2 + 2H^+ + 2e^- \rightarrow H_2O$ occurs, whereby chemical energy is converted to electric energy.

EXAMPLES

Now, the present invention will be explained in further detail with reference to Examples (1–7, 11, and 13) and Comparative Examples (8–10 and 12). However, it should be understood that the present invention is by no means restricted to such specific Examples

Example 1

9730 g of a powder of copolymer (ion exchange capacity: 1.1 meq/g dry resin, hereinafter referred to as copolymer A) consisting of polymer units derived from tetrafluoroethylene and polymer units derived from $CF_2=CF-OCF_2CF(CF_3)O(CF_2)_2SO_2F$ and 270 g of PTFE powder (trade name: Fluon CD-1, manufactured by Asahi Glass Co. Ltd.) were mixed and compounded by using a twin screw extruder to obtain 9500 g of pellets. A membrane having a thickness of 250 $\mu$m was obtained using the pellets through a single screw extruder. The resulting membrane was smoothed at a temperature of 220° C. by means of a heat-roll press and then was sandwiched between two amorphous polyethylene terephthalate films each having a thickness of 200 $\mu$m as support films for stretching, followed by a heat-roll press at 80° C. to obtain a membrane having its both sides laminated with the support films.

The membrane laminated with the support films was biaxially stretched at a temperature of 85° C. with each stretch ratio of 1.4 (area stretch ratio: 2) in each axial direction (a machine direction (MD direction) and a direction vertical to MD direction (TD direction)), to obtain a membrane, in which a stretched membrane having a thickness of 120 $\mu$m is sandwiched between two support films. The obtained membrane laminated with the support films was heat-treated at a temperature of 180° C. with a heat-roll press. Then, the support films were removed, and the membrane was hydrolyzed using an aqueous solution containing dimethyl sulfoxide and sodium hydroxide, followed by converting to acid-forms with hydrochloric acid, washing and drying to obtain a membrane having a thickness of 120 $\mu$m.

Further, in the same manner as described above, the above membrane was again sandwiched between two amorphous polyethylene terephthalate films as support films for stretching each having a thickness of 200 $\mu$m and laminated under heating, followed by biaxial stretching in each direction with a stretch ratio of 2 (area stretch ratio: 4), and removing the support films for stretching to obtain a fibril-reinforced membrane having a thickness of 30 $\mu$m. The thickness of the membrane obtained was measured at ten points with an interval of 5 cm, and the thickness-variations were within a range of ±3 $\mu$m

[Observation of Cross-Section of Reinforced Membrane with a Scanning Electron Microscope]

The cross-section of the above fibril-reinforced membrane was observed with a scanning electron microscope. At least 5 points were observed with a magnification of 10,000 times, and the number of fibrils having a fiber-diameter of at most 1 $\mu$m within an area of 5 $\mu$m-square were countered. That was 98% of the total number of fibrils.

[Measurement of Tear Strength of Fibril-Reinforced Membrane]

Strip-shaped specimens having 5 cm in width and 15 cm in length were prepared from the above fibril-reinforced membrane. Among them, 5 specimens have the longitudinal direction which was same as MD direction and 5 specimens have the longitudinal direction which was same as TD direction. On each specimen, a longitudinal slit extending from the center of the short side over half its length (7.5 cm) of the total length (15 cm) were formed so that the specimen was divided into two equal parts along the longitudinal direction. Each specimen was set in a tensile strength testing machine so that one of the cut end of the specimen is gripped by the upper chuck of the machine and the other cut end was gripped by the lower chuck of the machine, whereby the specimen would be torn from the tip of the slit along the length. The distance between the chucks was broaden at a speed of 200 mm/min. at a temperature of 25° C. and at a relative humidity of 50%, and the tear load was measured. The tear strength (N/mm) was calculated by dividing the tear load measured above with the thickness of the specimen. The tear strength of 5 specimens was measured and their average value was obtained. The tear strength of the fibril-reinforced membrane was 2.5 N/mm in MD direction and 15 N/mm in TD direction.

[Measurement of Resistance of Fibril-Reinforced Membrane]

A strip-shaped specimen having 5 mm in width from the above fibril-reinforced membrane was prepared. On the surface of the membrane, 5 pieces of platinum wire (diameter: 0.2 mm) were pressed at intervals of 5 mm in a direction in parallel with the width direction of the specimen. Then, the specimen was maintained in a vessel kept at a temperature of 80° C. and at a relative humidity of 95%. The alternative current resistivity was obtained by measuring an alternative current impedance between the platinum wire at alternative current of 10 kHz. Since the 5 pieces of platinum wire were pressed at each interval of 5 mm, the electrode distance could be changed at 5 mm, 10 mm, 15 mm and 20 mm. Accordingly, the alternative current resistance at each electrode distance was measured, and from an inclination was obtained between an electrode distance and the resistance, the resitivity of the membrane was obtained, whereby the influence by contact resistance between the platinum wire and the membrane was removed. Thus, good relation between the electrode and the resistance value measured was obtained, and the resistivity was calculated from the inclination and the thickness by the following formula:

Resistivity (Ω·cm)=a width of specimen (cm)×a thickness of specimen(cm)×inclination of resistance/between Pt electrodes (Ω/cm)

The resistivity of the fibril-reinforced membrane was 5 Ω/cm.

[Assembly and Evaluation of a Fuel Cell]

A fuel cell was assembled as follows. A coating liquid containing a copolymer (ion exchange capacity: 1.1 meq./g dry resin) consisting of polymer units derived from tetrafluoroethylene and polymer units derived from $CF_2=CF-OCF_2CF(CF_3)O(CF_2)_2SO_3H$ and platinum loaded carbon in a mass ratio of the copolymer/the carbon being ⅓ and using ethanol as a solvent was coated on a carbon cloth with a die-coating method, and dried to obtain a gas diffusion electrode layer to have a thickness of 10 μm and an amount of platinum loading of 0.5 mg/cm².

Two sheets of the carbon cloth were disposed so that their gas diffusion layers face to inside, and the above fibril-reinforced membrane was sandwiched between them, followed by pressing by means of a smooth plate press machine to obtain a membrane-electrode assembly. A fuel cell having an effective membrane area of 25 cm² was assembled by disposing a separator made of carbon plate having grooves for gas passages formed by cutting in zigzags outside this membrane-electrode assembly, and disposing a heater further their outside.

While maintaining the temperature of the fuel cell at 80° C., air was supplied to the cathode, and hydrogen was supplied to the anode, respectively, under a pressure of 1.5 atom. The terminal voltage was measured at a current density of 1 A/cm², and the terminal voltage was 0.62 V.

Further, the continuous operation of the above fuel cell was carried out at a temperature of 80° C. and at a current density of 1 A/cm². The terminal voltage after 1,000 hours was 0.62 V and thus no change was observed.

Example 2

The pellets were prepared and then formed to obtain a membrane having a thickness of 250 μm in the same manner as in Example 1 except that the amount of the powder of copolymer A was changed to 9600 g and the amount of PTFE powder was changed to 400 g. The obtained membrane was stretched in the same manner as in Example 1 to obtain a fibril-reinforced membrane having a thickness of 30 μm. The thickness-variations of the resulting membrane were measured in the same manner as in Example 1, whereby they were within a range of ±3 μm.

The resulting fibril-reinforced membrane was evaluated in the same manner as in Example 1, and the number of fibrils having a fiber-diameter of 1 μm or less was 96% based on the total number of fibrils. Further, the tear strength of the resulting fibril-reinforced membrane were 5.5 N/mm in MD direction and 18 N/mm in TD direction, respectively. The alternative current resistivity of the film was 6Ω·cm.

Using the above fibril-reinforced membrane, a fuel cell was assembled in the same manner as in Example 1 and the power generation performance was evaluated in the same manner as in Example 1. The terminal voltage was measured at a current density of 1 A/cm², and the terminal voltage was 0.61 V. The terminal voltage after 1,000 hours was 0.61 V and thus no change was observed.

Example 3

Using the membrane having a thickness of 250 μm obtained in the course of preparing the fibril-reinforced membrane in Example 1, it was smoothed by means of a heat-roll press, followed by laminating amorphous polyethylene terephthalate films (a thickness: 200 μm), which were used as support films for stretching, to their both sides to obtain a laminate-membrane in the same manner as in Example 1. This laminate-membrane was biaxially stretched at 85° C. with a stretch ratio of 3 (area stretch ratio: 9) to the directions of MD and TD, whereby a laminate-membrane having a stretched membrane having a thickness of 30 μm is sandwiched between two sheets of support films for stretching. In the same manner as in Example 1, the membrane obtained was heat-treated, followed by removing the support films, hydrolyzing, converting to acid-forms, washing with water and drying to obtain a fibril-reinforced membrane having a thickness of 30 μm. The thickness-variations of the resulting membrane were measured in the same manner as in Example 1, and they were within a range of ±3 μm.

The resulting fibril-reinforced membrane was evaluated in the same manner as in Example 1, and the number of fibrils having a fiber-diameter of at most 1 μm was 97% based on the total number of fibrils. Further, the tear strength of the fibril-reinforced membrane were 2.2 N/mm in MD direction and 14 N/mm in TD direction, respectively. The alternative current resistivity of the membrane was 5Ω·cm.

Using the above fibril-reinforced membrane, a fuel cell was assembled in the same manner as in Example 1 and the power generation performance was evaluated in the same manner as in Example 1. The terminal voltage was measured at a current density of 1 A/cm², and the terminal voltage was 0.60 V. The terminal voltage after 1,000 hours was 0.60 V and thus no change was observed.

Example 4

9,600 g of the powder of copolymer A and 400 g of PTFE powder (trade name: Fluon CD-1, manufactured by Asahi Glass Co. Ltd.) were mixed and extruded with twin screw extruder to obtain 9,500 g of pellets. The obtained pellets were formed with a single screw extruder to obtain a membrane having a thickness of 150 μm. The resulting membrane was smoothed by heated-press rolls at a temperature of 220° C. was sandwiched between amorphous polyethylene terephthalate films each having a thickness of 200 μm which were used as support films for stretching and heat-pressed by a roll at a temperature of 80° C. to obtain a membrane having both sides laminated with support films.

The above laminate-membrane was biaxially stretched at a temperature 85° C. with a stretch ratio of 1.4 in MD direction and with a stretch ratio of 7 (area stretch ratio: 10) in TD direction, followed by removing the support films to obtain a fibril-reinforced membrane having a thickness of 15 μm.

On the other hand, copolymer A alone was palletized by means of a twin screw extrusion and uni-axially extruded to obtain a membrane (a non-reinforced membrane) having a thickness of 5 μm.

The above non-reinforced membranes each having a thickness of 5 μm were laminated at a temperature of 180° C. by heated-press rolls on both sides of the above fibril-reinforced membrane having a thickness of 15 μm to obtain a three layered membrane having a thickness of 25 μm wherein the fibril-reinforced layer (a fibril-reinforced membrane) and the non-reinforced layers (a non-reinforced membrane) were laminated. The resulting three layered membrane was hydrolyzed using an aqueous solution containing dimethyl sulfoxide and sodium hydroxide, followed by converting to acid-forms with hydrochloric acid, washing, and drying to obtain a membrane (a laminate-membrane) having a thickness of 25 μm. The thickness-variations of the resulting laminate-membrane were measured in the same manner as in Example 1, and they were within a range of ±3 μm.

The tear strength and the alternative current resistivity of the resulting laminate-membrane were evaluated in the same manner as in Example 1. The tear strength were 2.0 N/mm in MD direction and 7.5 N/mm in TD direction, respectively. The alternative current resistivity was 6Ω·cm.

[Measurement of Hydrogen Gas Permeability of the Laminate-Membrane]

The obtained membrane was installed in a cell for a gas permeation equipment effective gas permeation area: 3.3 cm$^2$) which was maintained at a temperature of 70° C. A humidified hydrogen gas (gas flow amount: 30 cm$^3$/min.) at the one side of the membrane and a humidified argon gas at the other side of the membrane were supplied respectively. The hydrogen gas which permeated the membrane was detected by means of a gas-chromatography, and the hydrogen gas permeability of the membrane was measured. The amount of permeating gas was obtained at a membrane area of 1 cm$^2$, for a second and under a pressure difference of 1 Pa in the standard condition (0° C., 1 atom), and then converted to a value at a membrane thickness of 1 cm. The hydrogen gas permeability of the laminate-membrane at a temperature of 70° C. and at relative humidity of 95% was 6.9×10$^{-12}$ cm$^3$ (STP)·cm·cm$^{-2}$·s$^{-1}$·Pa$^{-1}$.

Using the above fibril-reinforced membrane, a fuel cell was assembled in the same manner as in Example 1 and the power generation performance was evaluated in the same manner as in Example 1. The terminal voltage was measured at a current density of 1 A/cm$^2$, and the terminal voltage was 0.63 V. The terminal voltage after 1,000 hours was 0.63 V and thus no change was observed.

Example 5

The pellets were prepared and then formed into a film to obtain a film having a thickness of 250 μm in the same manner as in Example 1 except that the amount of the powder of copolymer A was changed to 9,730 g and the amount of PTFE powder was changed to 270 g. The obtained film was laminated with a support film for stretching to obtain a laminated membrane in the same manner as in Example 4. This laminate-membrane was biaxially stretched at a temperature 85° C. with each stretch ratio of 2.5 (area stretch ratio: 6.3) in each direction (MD direction and TD direction), followed by removing the support film for stretching to obtain a fibril-reinforced membrane having a thickness of 40 μm.

On the other hand, a non-reinforced membrane made of copolymer alone was obtained in the same manner as in Example 4 except that the thickness was 40 μm. The above fibril-reinforced membranes each having a thickness of 40 μm were laminated by heated-press rolls on both sides of the above non-reinforced membrane to obtain a three layered film. The resulting three-layered film was hydrolyzed using an aqueous solution containing dimethyl sulfoxide and sodium hydroxide, followed by converting to acid-forms with hydrochloric acid, washing, and drying to obtain a membrane having a thickness of 120 μm.

Again, this membrane was sandwiched between amorphous polyethylene terephthalate films having a thickness of 200 μm which were used as support films for stretching and heat-pressed, followed by biaxial stretching at 85° C. with a stretch ratio of 2 (area stretch ratio: 4) in MD direction and in TD direction, and removing the support films for stretching to obtain a laminate-membrane. The thickness-variations of the resulting laminate-membrane were measured in the same manner as in Example 1, and they were within a range of ±3 μm.

The resulting laminate-membrane was evaluated in the same manner as in Example 4. The tear strength were 1.4 N/mm in MD direction and 9.5 N/mm in TD direction, respectively. The alternative current resistivity was 5Ω·cm. Further, the hydrogen gas permeability of the laminate-membrane at a temperature of 70° C. and a relative humidity of 95% was 6.4×10$^{-12}$ cm$^3$ (STP)·cm·cm$^{-2}$·s$^{-1}$·Pa$^{-1}$.

Using the above laminate-membrane, a fuel cell was assembled in the same manner as in Example 1 and the power generation performance was evaluated in the same manner as in Example 1. The terminal voltage was measured at a current density of 1 A/cm$^2$, and the terminal voltage was 0.65 V. The terminal voltage after 1,000 hours was 0.65 V and thus no change was observed.

Example 6

The pellets were prepared and then formed into a membrane to obtain a film having a thickness of 250 μm in the same manner as in Example 5 except that the amount of the powder of copolymer A was changed to 9,600 g and the amount of PTFE powder was changed to 400 g. In the same manner as in Example 5, a fibril-reinforced membrane was prepared using the above membrane. Then, in the same manner as in Example 5 except using the above fibril-reinforced membrane, the treatments e.g. lamination and stretching were carried out to obtain a laminate-membrane having a thickness of 30 μm. The thickness-variations of the resulting laminate-membrane were measured in the same manner as in Example 1, and they were within a range of ±3 μm.

The resulting laminate-membrane was evaluated in the same manner as in Example 4. The tear strength was 8.8 N/mm in MD direction and 13 N/mm in TD direction, respectively. The alternative current resistivity was 6Ω·cm. Further, the hydrogen gas permeability of the laminate-membrane at a temperature of 70° C. and a relative humidity of 95% was 6.2×10$^{-12}$ cm$^3$ (STP)·cm·cm$^{-2}$·s$^{-1}$·Pa$^{-1}$.

Using the above laminate-membrane, a fuel cell was assembled in the same manner as in Example 1 and the power generation performance was evaluated in the same manner as in Example 1. The terminal voltage was measured at a current density of 1 A/cm$^2$, and the terminal voltage was 0.64 V. The terminal voltage after 1,000 hours was 0.64 V and thus no change was observed.

Example 7

The pellets were prepared and then formed into a membrane to obtain a membrane having a thickness of 200 μm in the same manner as in Example 2 except that the amount of the powder of copolymer A was changed to 9,400 g and the amount of PTFE powder was changed to 600 g. In the same manner as in Example 1, the above membrane was laminated with support films for stretching, and the operation was carried out to obtain a fibril reinforced membrane having a thickness of 20 μm, in the same manner as in Example 4 except that each stretch ratio in MD direction and in TD direction was 3.3 (area stretch ratio: 10).

On the other hand, a polymer which had been prepared by hydrolyzing and converting the copolymer A to acid form was dissolved in ethanol under heating to obtain a solution having a solid concentration of 9% based on its total mass. This solution was cast on both sides of the above fibril-reinforced membrane to form layers each having a thickness of 5 μm, whereby a laminate-membrane having a thickness of 30 μm was obtained. The thickness-variations of the resulting laminate-membrane were measured in the same manner as in Example 1, and they were within a range of ±3 μm.

The resulting laminate-membrane was evaluated in the same manner as in Example 4. The tear strength was 10 N/mm in MD direction and 17 N/mm in TD direction, respectively. The alternative current resistivity was 7Ω·cm. Further, the hydrogen gas permeability of the laminate-membrane at a temperature of 70° C. and a relative humidity of 95% was 6.8×10$^{-12}$ cm$^3$ (STP)·cm·cm$^{-2}$·s$^{-1}$·Pa$^{-1}$.

Using the above laminate-membrane, a fuel cell was assembled in the same manner as in Example 1 and the power generation performance was evaluated in the same manner as in Example 1. The terminal voltage was measured at a current density of 1 A/cm$^2$, and the terminal voltage was 0.62 V. The terminal voltage after 1,000 hours was 0.62 V and thus no change was observed.

Example 8 (Comparative Example)

Using the membrane having a thickness of 250 μm obtained in the course of preparing the fibril-reinforced membrane in Example 1, the thickness of the membrane was thinned at a temperature of 180° C. by means of a heat-roll press apparatus to obtain a fibril-reinforced membrane having a thickness of 100 μm. In the same manner as in Example 1, this membrane was hydrolyzed, converted to acid-forms, washed and dried to obtain a fibril-reinforced membrane having a thickness of 100 μm. The thickness-variations of the resulting fibril-reinforced membrane were measured in the same manner as in Example 1, and variations of ±15 μm were observed.

The resulting fibril-reinforced membrane was evaluated in the same manner as in Example 1, and the number of fibrils having a fiber-diameter of 1 μm or less was 90% based on the total number of fibrils. Further, the tear strength of the fibril-reinforced membrane were 1.6 N/mm in MD direction and 10 N/mm in TD direction, respectively. The alternative current resistivity of the membrane was 5Ω·cm. The hydrogen gas permeability was 12.6×10$^{-12}$ cm$^3$ (STP)·cm·cm$^{-2}$·s$^{-1}$·Pa$^{-1}$.

Using the above fibril-reinforced membrane, a fuel cell was assembled in the same manner as in Example 1 and the power generation performance was evaluated in the same manner as in Example 1. The terminal voltage was measured at a current density of 1 A/cm$^2$, and the terminal voltage was 0.54 V. The terminal voltage after 1,000 hours was 0.52 V.

Example 9 (Comparative Example)

In the preparation of the membrane described in Example 1, the preparation of a membrane having at most 70 μm was tried by means of a heat-roll press to obtain a membrane having at most 70 μm. The thickness-variations of the resulting membrane were measured in the same manner as in Example 1. The thickness-variations were found to be ±25 μm and no membrane having a uniform thickness could be obtained.

Example 10

A fibril-reinforced membrane having a thickness of 100 μm was obtained in the same manner as in Example 1 except that the stretch ratio after the hydrolysis and the converting to acid-forms was 1.1 (area stretch ratio: 1.2). The thickness-variations of the resulting membrane were measured in the same manner as in Example 1 and were within a range of ±5 μm. The fibril-reinforced membrane was evaluated in the same manner as in Example 1, and the number of fibrils having a fiber-diameter of 1 μm or less was 95% based on the total number of fibrils. Further, the tear strength of the fibril-reinforced membrane were 20 N/mm in MD direction and 16 N/mm in TD direction, respectively. The alternative current resistivity of the film was 6Ω·cm.

Using the above fibril-reinforced membrane, a fuel cell was assembled in the same manner as in Example 1 and the power generation performance was evaluated in the same manner as in Example 1. The terminal voltage was measured at a current density of 1 A/cm$^2$, and the terminal voltage was 0.53 V. The terminal voltage after 1,000 hours was 0.53 V and thus no change was observed.

Example 11

In Example 1, instead of palletizing by twin screw extrusion, the mixture of the powder of the copolymer and PTFE was kneaded using two mixing rolls at a temperature of 230° C. The resulting kneaded mixture was crushed by a crusher and formed by means of single screw extrusion, in the same manner as in Example 1, to obtain a membrane having a thickness of 250 μm. This membrane was formed in the same manner as in Example 1, to obtain a fibril-reinforced membrane having a thickness of 30 μm. The thickness-variations of the resulting membrane were measured in the same manner as in Example 1 and were within a range of ±3 μm.

The obtained fibril-reinforced membrane was evaluated in the same manner as in Example 1, and the number of fibrils having a fiber-diameter of at most 55% based on the total number of fibrils. Further, the tear strength of the fibril-reinforced membrane were 0.8 N/mm in MD direction and 1.8 N/mm in TD direction, respectively. The alternative current resistivity of the film was 6Ω·cm.

Using the above fibril-reinforced membrane, a fuel cell was assembled in the same manner as in Example 1 and the power generation performance was evaluated in the same manner as in Example 1. The terminal voltage was measured at a current density of 1 A/cm$^2$, and the terminal voltage was 0.57 V. The terminal voltage after 1,000 hours was 0.51 V.

Example 12 (Comparative Example)

The copolymer A alone was used and film-formed to prepare a membrane containing no fibril reinforcement and having a thickness of 50 µm, in the same manner as in Example 1. This membrane was hydrolyzed, converted to acid-forms, washed and dried to prepare a membrane having a thickness of 50 µm. The thickness-variations of the resulting membrane were measured in the same manner as in Example 1 and were within a range of ±5 µm.

The obtained membrane was evaluated in the same manner as in Example 1, and the tear strength was 0.4 N/mm in MD direction and 0.6 N/mm in TD direction, respectively. The alternative current resistivity of the film was 5Ω·cm. The hydrogen gas permeability was $6.0 \times 10^{-12}$ cm$^3$ (STP) ·cm·cm$^{-2}$·s$^{-1}$·Pa$^{-1}$.

Using the above membrane, a fuel cell was assembled in the same manner as in Example 1 and the power generation performance was evaluated in the same manner as in Example 1. The terminal voltage was measured at a current density of 1 A/cm$^2$, and the terminal voltage was 0.53 V. The terminal voltage after 1,000 hours was 0.50 V.

Example 13

In the same manner as in Example 4, a biaxially stretched fibril-reinforced membrane having a thickness of 15 µm was obtained. The resulting membrane was hydrolyzed using a solution of dimethyl sulfoxide and potassium hydroxide, converted to acid-forms with hydrochloric acid, washed, and dried to obtain a membrane having a thickness of 15 µm.

On the other hand, the copolymer A was hydrolyzed and converted to acid-forms in the same manner as described above, and the resulting polymer was mixed with ethanol under heating to obtain a solution having a solid concentration of 9% based on the total mass. This solution was cast onto a polyester film with releasing agent at the surface such as poly(dimethyl siloxane) to obtain a non-reinforced cast thin membrane having a thickness of 2 µm.

The polyester films having a non-reinforced cast thin membrane having a thickness of 2 µm formed were disposed onto both sides of the fibril-reinforced membrane converted to so that the non-reinforced cast thin membranes were adjacent to the fibril-reinforced membrane, followed by laminating by means of a heat-roll press at a temperature of 180° C. Then, the polyester film at the outside was removed to obtain a three-layered film having a thickness of 19 µm, wherein the non-reinforced layers (non-reinforced cast thin membrane) were laminated to both sides of the fibril-reinforced membrane. The thickness-variations of the resulting membrane were measured in the same manner as in Example 1 and were within a range of ±5 µm.

The obtained membrane was evaluated in the same manner as in Example 4, and the tear strength was 2.2 N/mm in MD direction and 7.3 N/mm in TD direction, respectively. The alternative current resistivity of the film was 6Ω·cm. The hydrogen gas permeability at a temperature of 70° C. and a relative humidity of 95% was $6.2 \times 10^{-12}$ cm$^3$ (STP) ·cm·cm$^{-2}$·s$^{-1}$·Pa$^{-1}$.

Using the above membrane, a fuel cell was assembled in the same manner as in Example 1 and the power generation performance was evaluated in the same manner as in Example 1. The terminal voltage was measured at a current density of 1 A/cm$^2$, and the terminal voltage was 0.67 V. The terminal voltage after 1,000 hours was 0.67 V and no change was observed.

According to the present invention, a reinforced cation exchange membrane having a low electric resistance, high mechanical strength and an uniform thickness, compared with a conventional membrane is employed as a polymer electrolyte, whereby a polymer electrolyte fuel cell excellent in the performance at initial stage and stability in the long-term performance can be obtained.

The entire disclosures of Japanese Patent Application No. 2000-96596 filed on Mar. 31, 2000 and Japanese Patent Application No. 2000-116215 filed on Apr. 18, 2000 including specifications, claims and summaries are incorporated herein by reference in their entireties.

What is claimed is:

1. A method which comprises
   forming into a membrane a mixture of a perfluorocarbon polymer having sulfonic acid groups or their precursors and a fluorocarbon polymer which can be fibrillated,
   laminating a support film to at least one side of the membrane to form a laminated membrane, and
   stretching the laminated membrane under heating to form an electrolyte membrane having a thickness of from 3 to 70 µm.

2. The method according to claim 1, wherein the stretching is carried out under heating, and the fluorocarbon polymer is fibrillated so that number of fibrils having a fibril fiber-diameter of at most 1 µm is at least 70% of the total number of fibrils.

3. The method according to claim 1, wherein the perfluorocarbon polymer has precursors of sulfonic acid groups and the process further comprises forming the mixture into a membrane and hydrolyzing the precursors of sulfonic acid groups to an acid form before stretching under heating.

4. The method according to claim 1, wherein the support film comprises polyethylene terephthalate or polypropylene, and the stretching is carried out at a temperature of from 40 to 200° C.

5. The method according to claim 1, wherein the stretching is biaxial stretching.

6. The method of claim 1, wherein the electrolyte membrane has a thickness of from 3 to 30 µm.

7. A method for producing an electrolyte membrane for a polymer electrolyte fuel cell, wherein the membrane is a laminate comprising at least two cation exchange layers made of perfluorocarbon polymer having sulfonic acid groups, wherein at least one layer is reinforced with a reinforcement made of a fibrilliform fluorocarbon polymer, and at least one layer is not substantially reinforced with reinforcement, which comprises
   preparing a precursor membrane of a fibril-reinforced membrane, wherein preparing comprises forming into a membrane a mixture of a perfluorocarbon polymer having precursors of sulfonic acid groups and a fluorocarbon polymer which can be fibrillated to obtain a precursor membrane of a fibril-reinforced membrane;
   preparing a non-reinforced membrane, wherein preparing comprises forming into a membrane a perfluorocarbon polymer having precursors of sulfonic acid groups to obtain a non-reinforced membrane;
   stretching the precursor membrane to obtain a fibril-reinforced membrane; and
   laminating the fibril-reinforced membrane or the precursor membrane and the non-reinforced membrane to form an electrolyte membrane having a thickness of from 3 to 70 µm.

8. The method according to claim 7, wherein laminating is carried out after preparing the precursor membrane and preparing a the non-reinforced membrane, and then a support film for stretching is further laminated to at least one side of the resulting laminate of the precursor membrane and the non-reinforced membrane, followed by stretching.

9. The method according to claim 7, wherein the support film for stretching is made of a polyethylene terephthalate or a polypropylene, and the stretching is carried out at a temperature of from 40 to 200° C.

10. The method according to claim 7, wherein a support film for stretching is laminated to at least one side of the precursor membrane obtained by preparing a precursor membrane, and the resulting laminate is stretched under heating, followed by laminating the fibril-reinforced film and the non-reinforced membrane.

11. The method according to claim 10, wherein after stretching, the fibril-reinforced membrane is hydrolyzed and converted from the precursors of sulfonic acid groups to sulfonic acid groups, and after preparing the non-reinforced membrane, the non-reinforced membrane is hydrolyzed and converted from the precursors of sulfonic acid groups to sulfonic acid groups, and then laminating is carried out by laminating the resulting fibril-reinforced membrane having sulfonic acid groups and the resulting non-reinforced membrane having sulfonic acid groups.

12. The method according to claim 10, wherein the support film for stretching is made of a polyethylene terephthalate or a polypropylene, and the stretching is carried out at a temperature of from 40 to 200° C.

13. The method according to claim 7, wherein the stretching is biaxial stretching.

14. The method of claim 7, wherein the electrolyte membrane has a thickness of from 3 to 30 $\mu$m.

15. A method for producing an electrolyte membrane for a polymer electrolyte fuel cell, wherein the membrane is a laminate comprising at least two cation exchange layers made of a perfluorocarbon polymer having sulfonic acid groups, of which at least one layer is reinforced with a reinforcement made of a fibrilliform fluorocarbon polymer and at least one layer is not substantially reinforced with the reinforcement and the membrane has structure wherein at least one reinforced layer and one non-reinforced layer are alternately laminated and the structure is symmetrical in the thickness direction, which comprises preparing a precursor membrane of a fibril-reinforced membrane wherein preparing comprises forming into a film a mixture of a perfluorocarbon polymer having precursors of sulfonic acid groups and a fluorocarbon polymer which can be fibrillated to obtain a precursor membrane of a fibril-reinforced membrane;

stretching the resulting precursor membrane to obtain a fibril-reinforced membrane;

acid-form converting including hydrolyzing and treating the resulting membrane obtained from the stretching step to convert the precursors to the sulfonic acid groups; and preparing a non-reinforced cation exchange layer by casting a solution containing a perfluorocarbon polymer having sulfonic acid groups onto at least one side of the membrane obtained from acid-form converting.

16. The method of claim 15, wherein the membrane has a fibril-reinforced layer/non-reinforced layer/fibril reinforced layer structure or a non-reinforced layer/fibril reinforced layer/non-reinforced layer.

17. A method for producing an electrolyte membrane for a polymer electrolyte fuel cell, wherein the membrane is a laminate comprising at least two cation exchange layers made of perfluorocarbon polymer having sulfonic acid groups, of which at least one layer is reinforced with a reinforcement made of a fibrilliform fluorocarbon polymer and at least one layer is not substantially reinforced with the reinforcement and the membrane has structure wherein at least one reinforced layer and one non-reinforced layer are alternately laminated and the structure is symmetrical in the thickness direction, which comprises preparing a precursor membrane of a fibril-reinforced membrane, wherein preparing comprises forming into a membrane a mixture of a perfluorocarbon polymer having precursors of sulfonic acid groups and a fluorocarbon polymer which can be fibrillated to obtain a fibril-reinforced membrane;

stretching the resulting precursor membrane to obtain a fibril-reinforced membrane;

acid-form converting including hydrolyzing and treating the resulting film from the stretching to convert the precursors to sulfonic acid groups;

preparing a non-reinforced cation exchange layer by casting a solution containing a perfluorocarbon polymer having sulfonic acid groups onto a substrate; and laminating the fibril-reinforced film obtained from acid-form converting and the non-reinforced cation exchange layer to prepare a laminate.

18. The method of claim 17, wherein the membrane has a fibril-reinforced layer/non-reinforced layer/fibril reinforced layer structure or a non-reinforced layer/fibril reinforced layer/non-reinforced layer.

19. An electrolyte membrane which comprises a cation exchange membrane which comprises a perfluorocarbon polymer having sulfonic acid groups, reinforced with reinforcement comprising a fibril-form fluorocarbon polymer and which has a thickness of from 3 to 70 $\mu$m, wherein the number of the fibrils of the reinforcement having a fibril-fiber diameter of at most 1 $\mu$m is at least 70% of the total number of fibrils.

20. The electrolyte membrane according to claim 19, wherein an amount of the reinforcement is from 0.5 to 15 mass % based on the total mass of the electrolyte membrane.

21. The electrolyte membrane according to claim 19, wherein the reinforcement comprises at least 80%, based on the total mass of the reinforcement, of polytetrafluoroethylene or a copolymer containing polymerized polymer units derived from tetrafluoroethylene in an amount of at least 95 mol %, based on the copolymer.

22. The electrolyte membrane according to claim 19, wherein the perfluorocarbon polymer is a copolymer having polymerized polymer units derived from $CF_2=CF_2$ and polymerized polymer units derived from $CF_2=CF(OCF_2CFX)_m—O_p—(CF_2)_2SO_3H$, wherein X is a fluorine atom or a trifluoromethyl group; m is an integer of from 0 to 3; n is an integer of from 0 to 12; p is 0 or 1; if n is 0, p is 0.

23. An electrolyte membrane which is a laminate comprising at least two cation exchange layers comprising a perfluorocarbon polymer having sulfonic acid groups, of which at least one layer is reinforced with a reinforcement made of a fibril-form fluorocarbon polymer, and at least one layer is not reinforced with any reinforcement and the membrane has a structure wherein at least one reinforced layer and one non-reinforced layer are alternately laminated and the structure is symmetrical in the thickness direction.

24. The electrolyte membrane according to claim 23, wherein the membrane has a thickness of 3 to 70 $\mu$m.

25. The electrolyte membrane according to claim 24, wherein the number of fibrils of the reinforcement having a fibril-fiber diameter of at most 1 $\mu$m accounts for at least 70% of the total number of fibrils.

26. The electrolyte membrane according to claim 23, wherein an amount of the reinforcement is from 0.5 to 15 mass % based on the total mass of the electrolyte membrane.

27. The electrolyte membrane according to claim 23, wherein the reinforcement comprises at least 80%, based on the total mass of the reinforcement, of polytetrafluoroethylene or a copolymer containing polymerized polymer units derived from tetrafluoroethylene in an amount of at least 95 mol %, based on the copolymer.

28. The electrolyte membrane according to claim 23, wherein the perfluorocarbon polymer is a copolymer having polymerized polymer units derived from $CF_2=CF_2$ and polymerized polymer units derived from $CF_2=CF(OCF_2CFX)_mO_p-(CF_2)_nSO_3H$, wherein X is a fluorine atom or a trifluoromethyl group; m is an integer of from 0 to 3; n is an integer of from 0 to 12; p is 0 or 1; if n is 0, p is 0.

29. The electrolyte membrane of claim 23, wherein the membrane has a fibril-reinforced layer/non-reinforced layer/fibril reinforced layer structure or a non-reinforced layer/fibril reinforced layer/non-reinforced layer.

30. A polymer electrolyte fuel cell comprising an electrolyte membrane and a gas diffusion electrode disposed on each side of the membrane, wherein the electrolyte membrane comprises a cation exchange membrane comprising a perfluorocarbon polymer having sulfonic acid groups, and reinforced with reinforcement made of a fibrilliform fluorocarbon polymer, and the membrane having a thickness of from 3 to 70 $\mu$m, and the number of fibrils of the reinforcing material having a fibril-fiber diameter of at most 1 $\mu$m which is at least 70% of the total number of fibrils.

31. A polymer electrolyte fuel cell comprising an electrolyte membrane and a gas diffusion electrode disposed on each side of the membrane, wherein the electrolyte membrane comprises a cation exchange membrane, and is a laminate comprising at least two cation exchange layers comprising a perfluorocarbon polymer having sulfonic acid groups, of which at least one layer is reinforced with a reinforcement made of fibrilliform fluorocarbon polymer, and at least one layer is not reinforced with any reinforcement and the membrane has a structure wherein at least one reinforced layer and one non-reinforced layer are alternately laminated and the structure is symmetrical in the thickness direction.

32. The polymer electrolyte fuel cell according to claim 31, wherein the membrane has a thickness of from 3 to 70 $\mu$m, and number of fibrils of the reinforcement having a fibril-fiber diameter of at most 1 $\mu$m accounts for at least 70% of the total number of fibrils.

33. The electrolyte membrane of claim 31, wherein the membrane has a fibril-reinforced layer/non-reinforced layer/fibril reinforced layer structure or a non-reinforced layer/fibril reinforced layer/non-reinforced layer.

* * * * *